July 28, 1931.  R. W. SETHMAN  1,816,804
VALVE COUPLING
Filed Dec. 24, 1928

Inventor
Retus W. Sethman.
By
Attorney

Patented July 28, 1931

1,816,804

UNITED STATES PATENT OFFICE

RETUS W. SETHMAN, OF AKRON, OHIO, ASSIGNOR TO AKRON RUBBER MOLD & MACHINE CO., OF AKRON, OHIO, A CORPORATION OF OHIO

VALVE COUPLING

Application filed December 24, 1928. Serial No. 328,214.

This invention relates to valve couplings and it has particular relation to a device of the above designated character which is especially adapted for use at service-stations for making quick connection of tire inflating or deflating hose lines to the valve stems of vehicle tires and the like.

Although many devices have heretofore been proposed for this general purpose, all of them, so far as applicant is aware, are complicated in construction, involve many movable parts, and are therefore inefficient in operation which renders short their period of usefulness.

The primary object of this invention is to overcome the difficulties above mentioned by the provision of a valve coupling which is simple of construction, efficient in operation, and durable.

A full and complete understanding of the invention may be had from a consideration of the following detailed description in connection with the accompanying drawings, forming a part of the disclosure, wherein.

The invention, broadly considered, involves a valve coupling which may be positioned upon the valve stem by simple axial movement, and is then locked in threaded engagement therewith by release of a lever which forces a movable jaw into contact with the valve stem. Sealing contact is maintained between the coupling and valve stem by means of a gasket which is held in engagement with the valve stem by means of a spring-pressed piston movable within the body of the coupling.

Figure 1:
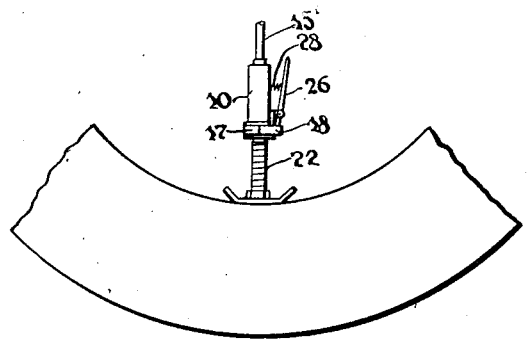
Figure 1 is a fragmentary side-elevational view illustrating a valve coupling embodying the features of this invention operatively associated with the valve stem of an innertube for a pneumatic tire casing.
Figure 2:
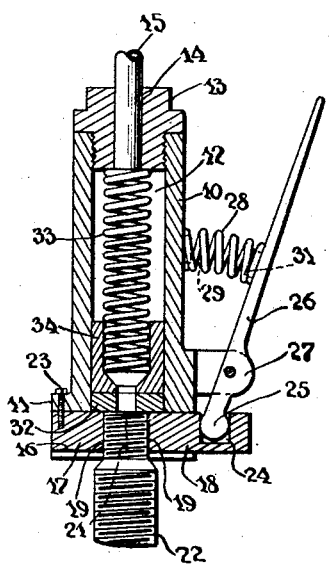
Figure 2 is a longitudinal central cross-sectional view, on a larger scale, of the inflating coupling operatively associated with a valve stem.
Figure 4:
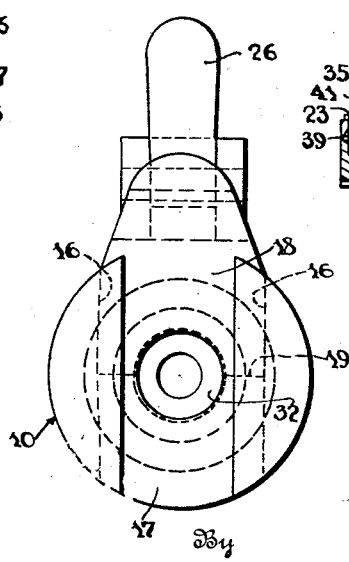
Figure 4 is a bottom plan view, on a still larger scale, of the embodiment of the invention shown in Figure 2.
Figure 3:
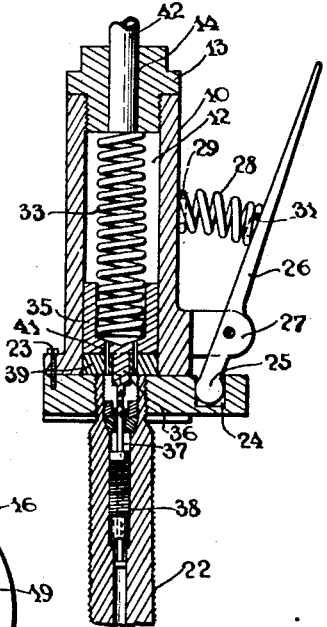
Figure 3 is a similar view illustrating the device with a deflating piston substituted for the inflating piston shown in Figure 2.

In the embodiment of the invention illustrated in Figures 1, 2 and 3 of the drawings, a substantially cylindrical body or sleeve 10 which is enlarged adjacent one end, as indicated at 11, is provided with a central longitudinal bore 12. A plug 13 threaded into one end of the body 12 is apertured as indicated at 14 for the reception of a hose 15 designed to be connected to a source of fluid pressure, not shown.

The enlarged portion 11 of the body 10 is provided with a substantially rectangular transverse guide-way 16 in communication with the bore 12. A pair of cooperating jaw members 17 and 18 are disposed within the guide-way 16 and are centrally apertured and threaded, as indicated at 19, to engage the threads 21 of a standard valve stem 22.

The jaw member 17 is secured removably in position within the guide-way 16 by means of machine screws 23 or the like. The jaw 18, however, is slidably mounted within the guide-way 16 and is provided with a recess 24 for the reception of an end 25 of a lever 26 which is pivoted intermediate its ends between a pair of lugs 27 extending from the body 10. An expansion-spring 28, having its ends encircling bosses 29 and 31 provided on the body 10 and the lever 26 respectively, serves normally to maintain the jaw 18 in its inner-most position and in contact with the jaw 17.

A circular centrally apertured gasket 32 of any desired material such as leather or rubber, is positioned within the bore 12 adjacent the jaws 17 and 18. This gasket is normally urged toward the guide-way 16 by a spring 33 which engages the plug 13 at one end and has its other end positioned within a cylindrical piston 34 which is slidable within the bore 12 and engages the gasket 32. The piston 34 is apertured in alinement with the aperture in the gasket 32 in order to provide a continuous central passage for the fluid.

From the foregoing it will be observed that depression of the free-end of the lever 26 by the hand which grips the coupling serves to separate the jaws 17 and 18 and thereby permits the coupling to be axially positioned upon the valve stem 22. This is preferably done with pressure in order that the spring 33 is compressed to cause tight contact between the valve stem and the gasket 32. Upon release of the lever 26 the spring 28 forces the jaw member 18 into engagement with the valve stem and maintains it in such position throughout the inflating operation. The pressure of the spring 33 together with the pressing of the inflating fluid against the piston 34, causes the gasket 32 to be held in tight engagement with the valve stem as is desired.

In order that the coupling may be advantageously employed for deflating as well as inflating articles, a different form of piston 35 is utilized. The piston 35 is provided with a central projecting pin 36 which is designed to contact with a pin 37 of the valve 38 to open the latter. It is also necessary to provide the piston 35 and gasket 39 with one or more aligned apertures 41 to permit passage of the fluid from the article. The operation of this embodiment, which is illustrated in Figure 3 of the drawings, is exactly the same as the embodiment illustrated in Figure 2 and the hose 42 may, if desired, be connected to a source of partial vacuum.

From the foregoing description it will be apparent that a valve coupling has been provided which may be quickly attached to and detached from any of the standard forms of valves, and may readily be employed either for inflation or deflation purposes. Since the device contains few movable parts, and these parts are of rugged construction, the device is capable of rendering long and efficient service.

Although I have illustrated only two forms which my invention may assume, and have described in detail only a single application thereof, it will be apparent to those skilled in the art that the invention is not so limited, but that various minor modifications may be made therein without departing from the spirit of the invention or from the scope of the appended claims.

What I claim is:

1. A valve coupling comprising a hollow body having a transverse guide-way extending therethrough, a threaded jaw removably secured in the guide-way, a second threaded jaw movable in the guide-way, a lever pivoted intermediate its ends on the body and having an end in operative connection with the movable jaw, means engaging the lever and body for normally maintaining the movable jaw in one position, a spring-pressed piston in the body and a gasket disposed in the body between the piston and the jaws.

2. A valve coupling comprising a hollow body; a pair of coacting jaws formed for engagement with a valve stem, carried by the body; one of the jaws being stationary and the other jaw being movable with respect to the body; means, normally yieldingly retaining the movable jaw in a predetermined position, operable manually to move the movable jaw; and a spring-pressed piston, formed with a projection for engagement with a valve in the stem held by the jaws, disposed within the body.

In witness wherof, I have hereunto signed my name.

Signed at Akron, in the county of Summit and State of Ohio, U. S. A., this 12th day of Nov., 1928.

RETUS W. SETHMAN.